US009879515B2

(12) United States Patent
Green et al.

(10) Patent No.: US 9,879,515 B2
(45) Date of Patent: Jan. 30, 2018

(54) PROPPANT MATERIALS AND METHODS OF TAILORING PROPPANT MATERIAL SURFACE WETTABILITY

(71) Applicant: Momentive Specialty Chemicals Inc., Columbus, OH (US)

(72) Inventors: John William Green, Cypress, TX (US); John Mario Terracina, Katy, TX (US); Jerry Francis Borges, Richmond, TX (US); Scott Edward Spillars, Houston, TX (US); Samantha Huixian Mah, Houston, TX (US)

(73) Assignee: HEXION INC., Columbus, OH (US)

( * ) Notice: Subject to any disclaimer, the term of this patent is extended or adjusted under 35 U.S.C. 154(b) by 572 days.

(21) Appl. No.: 13/627,907

(22) Filed: Sep. 26, 2012

(65) Prior Publication Data

US 2013/0081812 A1 Apr. 4, 2013

Related U.S. Application Data

(60) Provisional application No. 61/541,253, filed on Sep. 30, 2011, provisional application No. 61/549,083, filed on Oct. 19, 2011.

(51) Int. Cl.
*E21B 43/267* (2006.01)
*C09K 8/80* (2006.01)

(52) U.S. Cl.
CPC ............ *E21B 43/267* (2013.01); *C09K 8/805* (2013.01)

(58) Field of Classification Search
CPC ..... E21B 43/267; E21B 43/261; E21B 33/138
USPC ...................................... 166/280.1
See application file for complete search history.

(56) References Cited

U.S. PATENT DOCUMENTS

| 2,966,457 | A | 12/1960 | Starmann et al. |
| 4,195,010 | A | 3/1980 | Russell et al. |
| 4,439,489 | A | 3/1984 | Johnson et al. |
| 4,840,729 | A | 6/1989 | Levine |
| 4,993,491 | A | 2/1991 | Palmer et al. |
| 5,443,633 | A | 8/1995 | Hirsbrunner et al. |
| 6,503,676 | B2 | 1/2003 | Yamashita et al. |
| 6,632,527 | B1 | 10/2003 | McDaniel et al. |
| 7,135,231 | B1 | 11/2006 | Sinclair et al. |
| 7,585,817 | B2 | 9/2009 | Pope et al. |
| 2003/0224165 | A1 | 12/2003 | Anderson et al. |
| 2004/0023818 | A1 | 2/2004 | Nguyen et al. |
| 2005/0019574 | A1 | 1/2005 | McCrary et al. |
| 2005/0194141 | A1 | 9/2005 | Sinclair et al. |
| 2005/0244641 | A1 | 11/2005 | Vincent et al. |
| 2006/0035790 | A1 | 2/2006 | Okell et al. |
| 2007/0015669 | A1 | 1/2007 | Zhang |
| 2007/0172654 | A1 | 7/2007 | Leidolph et al. |
| 2009/0095473 | A1* | 4/2009 | Stephenson ............ C09K 8/805 166/280.2 |
| 2009/0221454 | A1 | 9/2009 | Welton et al. |
| 2010/0065271 | A1 | 3/2010 | McCrary et al. |
| 2010/0132943 | A1 | 6/2010 | Nguyen et al. |
| 2010/0163234 | A1* | 7/2010 | Fuller .................... C09K 8/584 166/278 |
| 2010/0204071 | A1 | 8/2010 | Zhang |
| 2010/0267593 | A1 | 10/2010 | Zhang |
| 2010/0292108 | A1 | 11/2010 | Kakadjian et al. |
| 2011/0180259 | A1 | 7/2011 | Willberg et al. |
| 2011/0186297 | A1 | 8/2011 | Zhang et al. |
| 2015/0329768 | A1 | 11/2015 | Grove, III |
| 2016/0137904 | A1 | 5/2016 | Drake et al. |
| 2017/0198211 | A1 | 7/2017 | Chen et al. |

FOREIGN PATENT DOCUMENTS

| CA | 2848264 | 11/2008 |
| CA | 2821377 | 4/2012 |
| CN | 101531893 | 9/2009 |
| CN | 101665682 | 3/2010 |
| CN | 101665686 | 3/2010 |
| WO | WO 2011/081549 A1 | 7/2011 |

OTHER PUBLICATIONS

B. Arkles et al., The Role of Polarity in the Structure of Silanes Employed in Surface Modification, Silanes and Other Coupling Agents, vol. 5, 51-61 (2009).
T. Mora et al., A Study of Hydraulic Fracture Conductivity and Its Dependence on Proppant Wettability, Petroleum Science and Technology, 28: 15, 1527-1534 (2010).
R. Rulison, Wettability Studies for Porous Solids Including Powders and Fibrous Materials, Krüss USA, Technical Note #302.
P.N. Manoudis, I. Karapanagiotis, Modification of the Wettability of Polymer Surfaces Using Nanoparticles, Prog. Org. Coat (2013).

* cited by examiner

*Primary Examiner* — Catherine Loikith
*Assistant Examiner* — Ashish Varma

(57) ABSTRACT

Proppant materials, and methods for making proppant materials, are provided. In one embodiment, the proppant material comprises a substrate material, a polymeric material disposed on the substrate material and a surface wettability modifier disposed on the polymeric material. Methods of making and using the proppant materials are also disclosed.

16 Claims, No Drawings

US 9,879,515 B2

PROPPANT MATERIALS AND METHODS OF TAILORING PROPPANT MATERIAL SURFACE WETTABILITY

RELATED APPLICATION DATA

This application claims benefit to U.S. Provisional Application No. 61/541,253, filed Sep. 30, 2011, and this application claims benefit to U.S. Provisional Application No. 61/549,083, filed Oct. 19, 2011, of which the entire contents of both applications are incorporated by reference herein.

FIELD OF THE INVENTION

The disclosure relates to proppant materials and to methods for making and using the same. In particular, this disclosure relates to proppant materials having wettability characteristics.

BACKGROUND OF THE INVENTION

The term "proppant" is indicative of particulate material which is injected into fractures in subterranean formations surrounding oil wells, gas wells, water wells, and other similar bore holes to provide support to hold (prop) these fractures open and allow gas or liquid to flow through the fracture to the bore hole or from the formation. Uncoated and/or coated particles are often used as proppants to keep open fractures imposed by hydraulic fracturing upon a subterranean formation, for example, an oil or gas bearing strata, and provide a conductive channel in the formation.

Fracturing of the subterranean formation is conducted to increase oil and/or gas production. Fracturing is caused by the injection of a fluid (either a hydrocarbon, water, foam or emulsion) into a formation at a rate that exceeds the formation's ability to accept the flow. The inability for the formation to dissipate the fluid results in a buildup of pressure. When this pressure buildup exceeds the strength of the formation rock, a fracture is initiated. Continued pumping of the fracturing fluid will result in the fracture growing in length, width and height. The rate required to initiate and extend the fracture is related to the injection rate and viscosity of the fracturing fluid.

The fracturing process also includes placing a particulate material, referred to as a "proppant material", "propping agent" or "proppant" in the formation to maintain the fracture in a propped condition when the injection pressure is released by resisting forces tending to close the fracture. As the fracture forms, the proppants are carried into the fracture by suspending them in a fracturing fluid or additional fluid or foam to fill the fracture with a slurry of proppant. Upon ceasing the injection of fluid, the proppants form a pack that serves to hold open the fractures. The propped fracture thus provides a highly conductive channel for the production of hydrocarbon and/or recovery of fracturing process water from the formation.

However, it has been observed that fluids flowing through the propped fracture have less than desirable or less than predicted flow rates. One theory is that the proppants forming the propped fracture are detrimentally affecting flow rates through the propped fractures.

It has been observed that during production from subterranean hydrocarbon bearing formations, formation wettability is an important parameter which affects fluid flow through the reservoir. Wettability is the tendency of one fluid to preferentially adhere to a solid surface in the presence of another immiscible fluid. While several strategies have been utilized to alter the wettability of the reservoir formation, current processes have not produced the desired wettability characteristics.

Accordingly, there is a need for a proppant material which is useful in improving fluid flow rates through propped features or reducing the effect of proppant materials on flow rates in a wellbore.

SUMMARY OF THE INVENTION

Embodiments of the invention are directed to materials suitable for use as proppant materials. The proppant materials include at least a composite substrate, a polymeric coating material, or a surface wettability modifier, of which each may improve the flowability of organic materials, water, or both.

In one aspect of the invention, a proppant material is provided, including a substrate material, a polymeric material disposed on the substrate material, and a surface wettability modifier disposed on the polymeric material. The proppant material may have a water contact angle from about 59° to about 120° and a surface energy from about 20 $mJ/m^2$ to about 50 $mJ/m^2$.

In another aspect of the invention, a proppant material is provided including a substrate material and a polymeric material disposed on the substrate material, wherein the polymeric material provides the proppant material with a water contact angle from about 59° to about 120° and a surface energy from about 20 $mJ/m^2$ to about 50 $mJ/m^2$.

In another aspect of the invention, a proppant material is provided including a composite substrate comprising a polymeric material comprising a water contact angle from about 59° to about 120° and a surface energy from about 20 $mJ/m^2$ to about 50 $mJ/m^2$ and a filler material dispersed throughout the polymeric material.

In another aspect of the invention, a method for treating a subterranean formation is provided, including injecting a fracturing fluid into the subterranean formation, wherein the fracturing fluid comprises a proppant material selected from the group consisting of a first proppant material comprising a first substrate material, a first polymeric material disposed on the substrate material, and a surface wettability modifier disposed on the polymeric material, a second proppant material comprising a second substrate material and a second polymeric material disposed on the substrate material, a third proppant material comprising a composite substrate having a third polymeric material and a filler material dispersed throughout the third polymeric material, wherein the surface wettability modifier or the first, second, or third polymeric material provides the proppant material with a water contact angle from about 59° to about 120° and a surface energy from about 20 $mJ/m^2$ to about 50 $mJ/m^2$.

DETAILED DESCRIPTION OF THE PREFERRED EMBODIMENTS

As used herein, the terms "first," "second," and the like do not denote any order or importance, but rather are used to distinguish one element from another, and the terms "the", "a" and "an" do not denote a limitation of quantity, but rather denote the presence of at least one of the referenced item. Furthermore, all ranges disclosed herein are inclusive of the endpoints and independently combinable.

Surface wettability or wetting is defined herein as the ability of a liquid to maintain contact with a solid surface, resulting from intermolecular interactions when the two are brought together. Surface wettability can be represented by a contact angle (θ), which is the angle at which the liquid-vapor interface meets the solid-liquid interface. Surface wettability may be characterized by measuring the contact angle, with water contact angles ranging between 0° and 70° indicating a water wettable surface; while those between 70° and 110° describe an intermediate or neutral wettability; and those varying between 110° and 180° indicates an oil wet system (a hydrophobic surface).

Surface energy quantifies the disruption of intermolecular bonds that occur when a surface is created. The surface energy may therefore be defined as the excess energy at the surface of a material compared to the bulk. For a liquid, the surface tension (force per unit length) and the surface energy density are identical. For example, water at 25° C. has a surface energy density of 0.072 $J/m^2$ and a surface tension of 0.072 N/m.

Embodiments of the invention are directed to materials suitable for use as proppant materials, also, referred to as proppants. The proppant materials include at least a polymeric coating material or a surface wettability modifier disposed on a substrate material that provides proppant material properties that improves the flowability of an organic material, water, or both. Alternatively, the substrate comprises a composite material as described herein with at least a polymeric material or a surface wettability material to provide the desired proppant material properties. The organic materials may be hydrocarbon materials, such as oil. The proppants materials are useful to prop open subterranean formation fractures and to improve fluid flow through propped open subterranean formation fractures. Alternatively, the proppant materials may include at least a polymeric coating material or a surface wettability modifier that reduces or minimizes the flowability of an organic material (such as oil), water, or both.

It is believed that the surface wettability and surface energy of uncoated proppant substrate material and resin (polymeric material) coated proppants may be altered to improve hydrocarbon production, enhance fracture processing water recovery, or reduce/prevent scaling as desired. It is believed that the surface wettability modifiers alter or "tailor" the surface of the proppant to have a desired wettability and surface energy without adversely impacting bond strength, such that the flowability of liquid hydrocarbon, gaseous hydrocarbon or water improves as desired.

It is believed that if the proppant surface condition is altered to be made more water-wet (a lower contact angle towards 90°), the surface modified proppant is expected to have better wetting during operations such as mixing in the blender tub. If the proppant surface condition is altered to be made less water-wet, the surface modified proppant is expected to enhance hydrocarbon production and reduce scaling reactions that detrimentally affect the conductivity (flow) of hydrocarbons.

If the proppant surface condition is altered to be made more neutral-wet or oil-wet, the surface modified proppant is expected to reduce scaling reactions that result in reduced flow of hydrocarbons material through and around proppant materials and proppant material packs. It is believed that neutral-wet prop will reduce prop scaling by preventing water from dissolving the proppant material. Additionally, better recovery of fracture processing water is expected from formations treated with proppant, in which the surface condition is altered to be made more oil-wet.

Prop scaling, or scaling, refers to the process in which minerals in the proppant substrate are dissolved in an aqueous medium, react with other dissolved minerals and salts, and precipitate as scale particles (mostly zeolites in the case of an uncoated ceramic substrate) that block porosity and reduce flow through the conductive path created by the originally placed proppant pack.

Presumably, if the surface of the proppant material is made less water wet, then there is a reduced tendency for water to spread on and preferentially adhere to or wet the solid proppant surface in the presence of other immiscible fluids, such as liquid hydrocarbons. If the aqueous medium is blocked from contact with the proppant material surface in this manner, then there is significantly reduced likelihood that the water can dissolve minerals in the proppant substrate or act as a medium for reaction of the dissolved minerals so that they can react to produce unwanted scale.

In one embodiment, the proppant material comprises a substrate material, a polymeric material disposed on the substrate material, and a surface wettability modifier disposed on the polymeric material.

In such as embodiment of the proppant material, the substrate material comprises from about 10% to about 98.99% by weight, such as from about 89% to about 98.99% by weight, for example, from about 96% to about 98% by weight, of the proppant material; the polymeric material may comprises from about 1% to about 6% by weight, such as from about 1.5% to about 5% by weight, for example, from about 1.8% to about 4% by weight, of the proppant material; and the surface wettability modifier comprises from about 0.01% to about 5% by weight, such as from about 0.05% to about 1% by weight, for example, from about 0.1% to about 1% by weight, of the proppant material.

In another embodiment, the proppant material comprises a substrate material and a polymeric material disposed on the substrate material, and the polymeric material provides for surface modification of the proppant material's outer surface to achieve the desired proppant material properties such as wettability and surface energy. In such an embodiment, the proppant material may be free of a separate surface wettability modifier. Alternatively, a surface wettability modifier may be disposed on the polymeric material.

In the embodiment of a proppant material comprising a substrate material and a polymeric material disposed thereon, with the polymeric material having surface wettability modifier properties as described herein, the substrate material comprises from about 10% to about 99.99% by weight, such as from about 95% to about 99.95% by weight, for example, from about 99% to about 99.9% by weight, of the proppant material. The polymeric material being a surface wettability modifier comprises from about 0.01% to about 5% by weight, such as from about 0.05% to about 1% by weight, for example, from about 0.1% to about 1% by weight, of the proppant material.

In another embodiment, the substrate material may be one or more polymeric materials as described herein. The substrate material may also comprise a composite substrate material of a polymeric material and fillers disposed within the polymeric material. Fillers may be inorganic fillers, organic fillers, or combinations thereof as described herein. In either embodiment, the polymeric material may provide for surface modification of the proppant material's outer surface to achieve the desired proppant material properties such as wettability and surface energy. Optionally, a polymeric coating layer, a surface wettability modifier, or combinations thereof may be applied to the composite substrate material. The substrate material of the one or more polymeric materials as described herein may be the same or different as an optional polymeric material forming a coating on the substrate material.

In another embodiment, the proppant material comprises a substrate material and a surface wettability modifier disposed on the substrate material.

In the embodiment of a proppant material comprising a substrate material and a surface wettability modifier disposed thereon, the substrate material comprises from about 10% to about 99.99% by weight, such as from about 95% to about 99.95% by weight, for example, from about 99% to about 99.9% by weight, of the proppant material. The surface wettability modifier comprises from about 0.01% to about 5% by weight, such as from about 0.05% to about 1% by weight, for example, from about 0.1% to about 1% by weight, of the proppant material.

The surface material of the proppant material, whether a polymeric material, surface wettability modifier, or both may be precured or a curable material. A curable proppant material has a coating that includes a material that is usually at least partially, and but not fully, cured. In contrast, a "precured" proppant material has a cured material coating. Materials used for curable coatings on proppant substrate materials may result in a highly crosslinked coating on the surface of the substrates.

In one embodiment, the proppant materials that are precured include a substrate core and a coating of material cured prior to insertion into a subterranean formation. The proppant materials that are curable include a substrate core and a coating of material at least partially cured downhole to form a consolidated proppant pack.

The terms "cured" and "curable" may be defined for the present specification by the bond strength of the surface material. In one embodiment described herein, curable is any surface material having a UCS Bond Strength of 10 psi or greater, such as from 10 psi to about 300 psi or more, such as from 10 psi to about 1200 psi.

For purposes of this application, the term "cured" and "crosslinked" are used interchangeably for the hardening which occurs in an organic material as described herein. However, the term "cured" also has a broader meaning in that it generally encompasses the hardening of any material, organic or inorganic, to form a stable material. For example, crosslinking, ionic bonding and/or removal of solvent to form a bonded material in its final hardened form may be considered curing. Thus, mere removal of solvent from an organic binder prior to crosslinking may or may not be curing depending upon whether the dry organic binder is in final hardened form.

The proppant material may be in the form of individual particles that may have a particle size in the range of ASTM sieve sizes (USA Standard Testing screen numbers) from about 6 to 200 mesh (screen openings of about 3360 μm or about 0.132 inches to about 74 μm or 0.0029 inches). Typically for proppant or gravel pack individual particles of the particulate substrate have a particle size in the range of USA Standard Testing screen numbers from about 8 to about 100 mesh (screen openings of about 2380 μm or about 0.0937 inches to about 150 μm or about 0.0059 inches), such as from 20 to 80 mesh (screen openings of about 841 μm or about 0.0311 inches to about 177 μm or 0.007 inches), for example, 40 to 70 mesh, (screen openings of about 400 μm or about 0.0165 inches to about 210 μm or 0.0083 inches) may be used to define the particle size.

In one embodiment of the invention, the proppant material size is 20/40 mesh, 30/50 mesh, or 40/70 mesh. A size of a 20/40 mesh is commonly used in the industry as a material having a size between a 20 mesh and 40 mesh as described herein. Smaller mesh proppants, such as 40/70 mesh proppants, may be used in low viscosity fracture fluids, and larger mesh proppants, such as 20/40 mesh proppants, may be used in high viscosity fracture fluids.

The proppant material may comprise a substrate material of a particulate material. The substrate material may be any organic or inorganic particulate material normally used as propping materials. Suitable particulate materials include inorganic materials (or substrates), such as exfoliated clays (for example, expanded vermiculite), exfoliated graphite, blown glass or silica, hollow glass spheres, foamed glass spheres, cenospheres, foamed slag, sand, naturally occurring mineral fibers, such as zircon and mullite, ceramics, sintered ceramics, such as sintered bauxite or sintered alumina, other non-ceramic refractories such as milled or glass beads, and combinations thereof. Exemplary inorganic substrate materials may be derived from silica sand, milled glass beads, sintered bauxite, sintered alumina, mineral fibers such as zircon and mullite, or a combination comprising one of the inorganic substrate materials.

Suitable organic particulate materials include organic polymer materials, naturally occurring organic substrates, and combinations thereof. The organic polymer materials may include any of the polymeric materials described herein that are carbon-based polymeric materials.

Naturally occurring organic substrates are ground or crushed nut shells, ground or crushed seed shells, ground or crushed fruit pits, processed wood, ground or crushed animal bones, or a combination comprising at least one of the naturally occurring organic substrates. Examples of suitable ground or crushed shells are shells of nuts such as walnut, pecan, almond, ivory nut, brazil nut, ground nut (peanuts), pine nut, cashew nut, sunflower seed, Filbert nuts (hazel nuts), macadamia nuts, soy nuts, pistachio nuts, pumpkin seed, or a combination comprising at least one of the foregoing nuts. Examples of suitable ground or crushed seed shells (including fruit pits) are seeds of fruits such as plum, peach, cherry, apricot, olive, mango, jackfruit, guava, custard apples, pomegranates, watermelon, ground or crushed seed shells of other plants such as maize (e.g., corn cobs or corn kernels), wheat, rice, jowar, or a combination comprising one of the foregoing processed wood materials such as, for example, those derived from woods such as oak, hickory, walnut, poplar, mahogany, including such woods that have been processed by grinding, chipping, or other form of particalization. An exemplary naturally occurring substrate is a ground olive pit The substrate may also be a composite particle, such as at least one organic component and at least one inorganic component, two or more inorganic components, and two or more organic components. For example, the composite may comprise an organic component of the organic polymeric material described herein having inorganic or organic filler materials disposed therein. In a further example, the composite may comprise an inorganic component of any of the inorganic polymeric material described herein having inorganic or organic filler materials disposed therein.

Inorganic or organic filler materials include various kinds of commercially available minerals, fibers, or combinations thereof. The minerals include at least one member of the group consisting of silica (quartz sand), alumina, mica, meta-silicate, calcium silicate, calcine, kaoline, talc, zirconia, boron, glass, and combinations thereof. Fibers include at least one member selected from the group consisting of milled glass fibers, milled ceramic fibers, milled carbon fibers, synthetic fibers, and combinations thereof.

The substrate material may have any desired shape such as spherical, egg shaped, cubical, polygonal, or cylindrical, among others. It is generally desirable for the substrate material to be spherical in shape. Substrate materials may be porous or non-porous. Preferred substrate particles are hard and resist deforming. Alternatively, the substrate material may be deformable, such as a polymeric material. Deforming is different from crushing wherein the particle deteriorates usually creating fines that can damage fracture conductivity. In one embodiment, the inorganic substrate material does not melt at a temperature below 450° F. or 550° F.

The proppant material may have one or more polymeric materials disposed on the substrate in one or more layers, which may be referred to as a coating or coating layer. Each of the polymeric materials may be disposed as a continuous or non-continuous coating layer. The continuous layer may comprise the polymeric material, and optionally, additives as further described herein. Each of the one or more layers may be the same or different polymeric material as each of the other layers.

For example, the polymeric layer coating may be deposited in a multi-step, multi-layer process of a first polymeric material of resole phenol-formaldehyde, a second polymeric material of a terpolymer of phenol-formaldehyde-furfuryl alcohol, a third polymeric layer of a novolac phenol-formaldehyde material, and then a fourth layer of resole phenol-formaldehyde resin. In another example, the polymeric layer coating may be deposited in a multi-step, multi-layer process of a first polymeric material of a liquid polymeric material of resole phenol-formaldehyde, a second polymeric material of a liquid polymeric material of resole phenol-formaldehyde, and a third polymeric material of a novolac phenol-formaldehyde material, were added sequentially to form the coating.

Suitable polymeric materials may comprise thermosetting polymers. Additional, suitable organic materials that may be used as the coating are polymer precursors (for example, low molecular weight species such as monomers, dimers, trimers, or the like), oligomers, polymers, copolymers such as block copolymers, star block copolymers, terpolymers, random copolymers, alternating copolymers, graft copolymers, or the like; dendrimers, ionomers, or a combination comprising at least one of the foregoing.

Suitable polymeric materials may be selected from the group of a phenol-formaldehyde resin, a fluorine free and silicon free epoxy resin, a fluorine free and silicon free epoxy resin epoxy-modified novolac a phenol-formaldehyde resin, a novolac phenol-formaldehyde resin, a resole phenol-formaldehyde resins, a modified resole phenol-formaldehyde resin, a terpolymer of phenol-furfuryl alcohol (or furfuryl aldehyde)-formaldehyde, a polymerized furan (for example, furfural alcohol-formaldehyde), a polyurethane resin, a polymerized urea-aldehyde, a polymerized melamine-aldehyde, a polyester, a polyalkyd, a polymerized phenol-aldehyde, and combinations thereof; blends, copolymers thereof, and combinations thereof.

Blends and copolymers of epoxy resin with one or more of resole resins, terpolymers of phenol, furfuryl alcohol (or furfuryl aldehyde) and formaldehyde, furans, for example, furfural alcohol-formaldehyde, and furans, for example, furfural alcohol-formaldehyde, are also suitable as the polymeric materials according to the present invention.

Suitable fluorine and silicon free epoxy resins, for example, may be selected from glycidyl ethers made from bisphenol A and epichlorohydrin. These resins are available in liquid form having a typical viscosity of about 200 to about 20,000 centipoises, and an epoxide equivalent weight of about 170 to about 500 and weight average molecular weight of about 350 to about 4000. Typical epoxy resins include ARALDITE 6005 sold by Huntsman Corporation or EPN 1139 novolac-based epoxy resin such as a liquid epoxy novolac resin manufactured by Ciba-Geigy Corporation or Dow DER 331 epoxy resin is manufactured by Dow Chemical Company, Midland, Mich. However, solid epoxy resins (solid in the neat state) may be employed if they are soluble in the coating resin system and reactive. Preferred epoxies of the present invention include bisphenol A based aromatic epoxies such as DGEBPA (di-glycidyl ether of bis-phenol-A, for example EPON 828 available from Momentive Specialty Chemicals, Inc.), cycloaliphatic epoxies (for example EPONEX 1510 available from Momentive Specialty Chemicals, Inc.) and bisphenol F based epoxy (for example EPON 862 available from Momentive Specialty Chemicals, Inc.).

Vinyl esters are produced by reacting epoxy resins with ethylenically unsaturated carboxylic acids. Bisphenol A epoxy resins, epoxy novolac resins or brominated analogues may be used for epoxy resins. Common acids used to esterify the epoxy resins are acrylic acid and methacrylic acid, but crotonic acid, cinnamic acid and other unsaturated acids can also be used. The resulting epoxy resins may be cured in free radical reactions alone (homopolymerization) or used with unsaturated monomers (copolymerization), such as styrene and other monomers as mentioned above for unsaturated polyester resins. Vinyl esters may be cured by the methods described above for unsaturated polyesters. Examples of commercially available vinyl esters include DERAKANE supplied by Ashland, HYDROPEL resins provided by AOC. Preferred vinyl esters are those made free from the use of acrylic acid and methacrylic acid.

Epoxy-modified novolac resins are disclosed by U.S. Pat. No. 4,923,714 to Gibb et al. incorporated herein by reference. The phenolic portion can comprise a phenolic novolac polymer; a phenolic resole polymer; a combination of a phenolic novolac polymer and a phenolic resole polymer; a cured combination of phenolic/furan or a furan resin to form a precured resin (as disclosed by U.S. Pat. No. 4,694,905 to Armbruster incorporated herein by reference); or a curable furan/phenolic resin system curable in the presence of a strong acid to form a curable resin (as disclosed by U.S. Pat. No. 4,785,884 to Armbruster). The phenolics of the abovementioned novolac or resole polymers may be phenol moieties or bis-phenol moieties.

An embodiment of the present invention employs a polymeric material of a phenol-aldehyde resole polymer that may have a molecular weight average ranging from about 400 to about 2000. The phenol-aldehyde resole resin has a phenol:aldehyde molar ratio from about 1:1 to about 1:3, typically from about 1:1 to about 1:1.95. A preferred mode of preparing the resole resin is to combine phenol with a source of aldehyde such as formaldehyde, acetaldehyde, propionaldehyde, furfural, benzaldehyde or paraformaldehyde under alkaline catalysis. During such reaction, the aldehyde is present in molar excess. It is preferred that the resole resin have a molar ratio of phenol to formaldehyde from about 1:1.1 to 1:1.6. The resole resins may be low free phenol resole resins having less than 3 wt. %, more preferably less than 2 wt. % free phenol. However, higher free phenol ranges may be employed, such as the 2.0%-4.0% free phenol specification range of the OWR-262E resole or the 8.0% or more free phenol of Oil Well Resin 9200 resole available from Momentive Specialty Chemicals, Inc. The resoles may be conventional resoles or modified resoles.

Modified resoles are disclosed by U.S. Pat. No. 5,218,038, incorporated herein by reference in its entirety. Such modified resoles are prepared by reacting aldehyde with a blend of unsubstituted phenol and at least one phenolic material selected from the group consisting of arylphenol, alkylphenol, alkoxyphenol, and aryloxyphenol.

The term "novolac" refers to the resin products of the substantially complete condensation of a phenol with an aldehyde in such proportions that condensation is not capable of proceeding to form an infusible product. Novolacs are usually produced by the condensation of unsubstituted phenol with formaldehyde in approximately equimolecular proportions, often with a slight excess of phenol. A novolac is fusible and, since it does not contain a sufficiently high proportion of formaldehyde to enable condensation to a thermoset condition, it can be heated to fusion and then resolidified repeatedly without undergoing chemical change."

The novolac can be produced by condensation of phenol and formaldehyde. Alternatively, the phenolic species can be an alkylphenol, and arylphenol, a diphenol or a bisphenol. While the aldehyde is typically formaldehyde, acetaldehyde or other aldehydes can be used. It is preferred that the novolac resin have a molar ratio of formaldehyde to phenol from about 0.60 to 0.90. The novolac resins may be low free phenol novolac resins, having less than 1 wt. % free phenol such as Durite SD-672D available from Momentive Specialty Chemicals. However, higher free phenol ranges may be employed, such as the 1.0%-10.0% free phenol. The novolacs may be conventional novolacs or modified novolacs.

A phenol-formaldehyde-furfuryl alcohol terpolymer is prepared from the catalytic reaction of phenol, aldehyde (such as formaldehyde) and furfuryl alcohol, wherein the catalyst is a water soluble multivalent metal salt, and wherein the reaction is carried out under essentially hydrous conditions. In general, the mole ratio of phenol to furfuryl alcohol can vary from about 0.1:1 to about 10:1, respectively. The mole ratio of formaldehyde to phenol+furfuryl alcohol can vary from about 0.5:1 to 2:1, respectively in moles of $CH_2O$:phenol+furfuryl alcohol. The amount of catalyst can vary from about 0.2% to about 8% by weight of the total amount of phenol and furfuryl alcohol.

Furans employable in the present invention include resins made from urea formaldehyde and furfuryl alcohol; urea formaldehyde, phenol formaldehyde and furfuryl alcohol; phenol formaldehyde and furfuryl alcohol; or formaldehyde and furfuryl alcohol. Suitable furan resin for use as a binder or coating for the cores of the present invention is disclosed by U.S. Pat. No. 4,694,905 to Armbruster incorporated herein by reference, or other furan resins known in the art. Alternatively, furfuraldehyde may be used in the place of furfuryl alcohol as described in the terploymer herein.

Polyurethane resins are made by mixing a polyisocyanate component, a polyhydroxy component and a catalyst. Typically the polyhydroxy component is a polyhydroxy phenolic component dissolved in solvent. Generally the solvents are mixtures of hydrocarbon and polar organic solvents such as organic esters. Exemplary hydrocarbon solvents include aromatic hydrocarbons such as benzene, toluene, xylene, ethyl benzene, high boiling aromatic hydrocarbon mixtures, heavy naphthas and the like. Also, polyurethanes are disclosed by U.S. Pat. No. 5,733,952 to Geoffrey, incorporated herein by reference.

Typical melamine phenolic resins for coating substrate are disclosed by U.S. Pat. Nos. 5,296,584, 5,952,440 and 5,916,966 to Walisser incorporated herein by reference. The term melamine resin is a general term to encompass any melamine-formaldehyde resin with or without other ingredients, for example, urea groups. Typically, mixtures of resoles and melamines are heated to effect a melamine formaldehyde reaction to produce a dissolved methylol melamine reaction product (See U.S. Pat. No. 4,960,826).

Unsaturated polyesters, commonly referred to as "alkyds", are formed by the condensation of polyols and polycarboxylic acids with olefinic unsaturation being contributed by one of the monomers, usually the acid. Generally, difunctional alcohols (glycols) and difunctional acids are used in the condensation reaction. Examples of commercially available unsaturated polyester resins suitable for the application include AROPOL from Ashland Chemical, DION, FINE-CLAD and POLYLITE from Reichhold Chemicals, STYPOL from Cook Composites & Polymers, and AQUA SHIELD from Advance Coatings.

In one embodiment, the thermosetting polymers may be further modified by functionalities or polymer blocks that are permanently bound, covalently or otherwise, to the backbone of the main polymer, or a polymer to provide the desired proppant properties as described herein with regard to water contact angle, surface energy, bond strength, and combinations thereof. Examples of such polymer modification agents may include silanol groups (Si—OH group), siloxane groups, and combinations thereof. For example, a silanol group of a silanol-functional silicone may be reacted with a phenolic polymer, which may provide a phenolic polymeric material modified by siloxane blocks.

In one embodiment, the thermosetting polymers may be selected to provide the desired proppant properties as described herein with regard to water contact angle and surface energy, and optionally, bond strength, as the surface wettability modifier. Such polymeric materials provide the same changes in the desired properties and function and the polymeric material version of the surface wettability modifiers described herein. Suitable polymeric materials performing as surface wettability modifiers that may be used to form a coating of the proppant may be selected from the group of polysilicones, an acrylate polymer, a silane-containing polymer, a fluorine-containing polymer, and combinations thereof. In such an embodiment, the proppant material is formed without the presence of a separate surface wettability modifier as described herein.

Suitable polysilicone materials include, but are not limited to, siloxane polyalkyleneoxide copolymers. Examples of such copolymers include products sold under the tradenames L-7604 polymer, L-8500 polymer, Silbreak™ 321 polymer, L-7605 polymer, Y-17424 polymer, Y-17233, and combinations thereof, which are commercially available from Momentive Performance Materials. Alternatively, the proppant materials described herein may be free of a siloxane polyalkyleneoxide co-polymer.

Suitable acrylates include, but are not limited to, fluoroalkylmethacrylate copolymers, fluoroalkylacrylate copolymers, polyester acrylates, epoxy modified acrylates, urethane acrylates oligomers, and combinations thereof. The acrylates may be provided in the form of an aqueous solution. Examples of suitable acrylates include compounds sold under the tradenames S-2005, a fluoroalkylmethacrylate copolymer, S-2042, an aqueous solution of fluoroalkylmethacrylate copolymer, S-2023B, a fluoroalkylacrylate copolymer, S-2059B, an aqueous solution of fluoroalkylacrylate, and combinations thereof, which are commercially available from Daikin America, of Decatur, Ala.

Suitable silane-containing polymer materials include fluoroalkylsilanes. Examples of suitable fluoroalkylsilanes include trifluoropropyltrimethoxysilane, nonafluorohexyltriethoxysilane, and combinations thereof.

Suitable fluorine-containing polymer materials may include fluorinated derivatives of the polymeric materials described herein and may include fluorine-containing co-polymers as described herein. Examples of fluorine-containing polymer materials may include fluorine-containing epoxy materials, fluoroacrylates, heptadecafluorodecyltrimethoxysilane polyalkylenedimethylsiloxane copolymer, and combinations thereof.

Suitable polymeric materials may also comprise thermoplastic polymers. The thermoplastic polymers may be used in combination with thermosetting polymers as described herein. The thermoplastic polymers may be selected from the group of polyethylene, polypropylene, polyethyleneterepthalate, polyvinyl chloride, polystyrene, among others, and the thermoplastic polymers used for the polymeric material coating are free of the materials described herein for the surface wettability modifiers and the polymeric materials performing as surface wettability modifiers as described herein.

The polymeric material disposed on the substrate material or the substrate material may be exposed to, treated with, or deposited with one or more surface wettability modifiers. In one aspect of the invention, the surface wettability modifiers described herein may be disposed on or added to any exposed polymeric material disposed on the substrate material, disposed on or added to any exposed portions of the substrate material, or both. In another aspect of the invention, the surface wettability modifiers are added to a fracturing fluid in which the proppant materials are disposed therein, and which may change the wettability characteristics of the proppant materials in the fracturing fluid. The one or more surface wettability modifiers may be deposited on the polymeric material, the substrate material, or both, in one or more layers, and each layer may be the same or different surface wettability modifier material from another layer.

The surface wettability modifiers and the polymeric materials performing as surface wettability modifiers are used to provide a water contact angle from about 59° to about 120°, such as from greater than 75° to about 110°, for example, from about 76° to about 95°, or from about 76° to about 87°. Alternatively, the water contact angle may be from about 59° to about 120°, such as from 59° to about 110°, for example, from about 59° to about 75°, or from about 76° to about 95°. It is believed that the surface wettability modifiers and the polymeric materials performing as surface wettability modifiers provide for an increase in the water contact angle from about 1° to about 120°, such as from about 1° to about 65°, for example, about 1° to about 35°, from the polymeric material, substrate material, or both. One method to determine wettability (water contact angle) is found in Application Note 402, "wettability Studies for Porous Solids Including Powders and Fibrous Materials", by Christopher Rulison of Augustine Scientific of Newbury, Ohio, 2002.

Suitable surface wettability modifiers include silicon-containing materials, fluorine-containing materials, acrylate materials, polyamides, and combinations thereof, among others.

In another alternative embodiment, the proppant material includes the surface wettability material disposed directly on the substrate material. In a first aspect, the surface wettability material is disposed on a substrate material in the absence of a polymeric material. In a second aspect, the surface wettability material is disposed on a substrate material in the presence of a discontinuously applied polymeric material layer. In one version of the second aspect, a discontinuous polymeric layer is disposed first with the discontinuous polymeric layer exposing a portion of the substrate material on which the surface wettability material may be disposed. In another version of the second aspect, the surface wettability layer is disposed on the substrate material, and then a discontinuous polymeric layer is disposed with the discontinuous application exposing a portion of the disposed surface wettability material.

Suitable silicon-containing materials may include silanes, silicon-containing surfactants, silicones, silsesquioxanes, silicone-containing epoxy materials, and combinations thereof, among silicon-containing materials. Suitable silsesquioxanes include polyhedral oligomeric silsesquioxanes (POSS), functionalized polyhedral oligomeric silsesquioxanes, and combinations thereof.

Suitable polysilicone materials include, but are not limited to, siloxane polyalkyleneoxide copolymers. Examples of such copolymers include products sold under the tradenames L-7604 polymer, L-8500 polymer, Silbreak™ 321 polymer, L-7605 polymer, Y-17424 polymer, Y-17233, and combinations thereof, which are commercially available from Momentive Performance Materials. Alternatively, the proppant materials described herein may be free of a siloxane polyalkyleneoxide co-polymer.

Examples of silane materials include triethoxysilylpropoxy(hexaethyleneoxy)dodecanoate, triethoxysilylpropoxy(triethyleneoxy)octadecanoate, tridecafluorooctyltriethoxysilane, heptadecafluorodecyltrimethoxysilane polyalkylenedimethylsiloxane copolymer, polydimethylsiloxane emulsion, polyalkyleneoxide modified polydimethylsiloxane, siloxane polyalkyleneoxide co-polymer, organo-modified polydimethylsiloxane, alkyl modified siloxane, an alkyl-aryl polydimethylsiloxane emulsion, organomodified silicone emulsion, trifluoropropyltrimethoxysilane, nonafluorohexyltriethoxysilane, and combinations thereof.

Suitable fluorine-containing materials include fluorinated or perfluorinated oligomers and polymers, fluorosurfactants, fluoroacrylates, fluorine-containing epoxy materials, and combinations thereof, among other fluorine-containing materials. Additionally, a perfluorinated or partially fluorinated group can be added as a pendant group or as a backbone component of most polymers as described herein to form the desired fluorine-containing materials.

Examples of fluorine-containing materials include 2-propenoic acid, 2-[methyl[(nonafluorobutyl)sulfonyl]amino] ethyl ester, tridecafluorooctyltriethoxysilane, heptadecafluorodecyltrimethoxysilane polyalkylenedimethylsiloxane copolymer, trifluoropropyltrimethoxysilane, nonafluorohexyltriethoxysilane, fluoroalkyl acrylate copolymer, and combinations thereof. One commercial example of a fluorine-containing material is Novec fluorosurfactant FC-4430, a nonionic fluorochemical surfactant available from 3M.

Additionally, suitable fluorine-containing materials include fluorinated materials having one or more epoxy groups. Examples of fluorinated epoxy materials include fluorinated version of the following epoxy materials: EPON HPT Resin 1050, EPON Resin 1001F, EPON Resin 1002F, EPON Resin 1004F, EPON Resin 1007F, EPON Resin 1009F, EPON Resin 1031, EPON Resin 1123-A-80, EPON Resins 154, 160, 161, and 164, EPON Resins 2002, 2004, and 2005, EPON Resin 3002, EPON Resin 8021, EPON™ Resin 8161, EPON Resin 828, EPON Resin 830, EPON Resin 834, EPON Resin 862, EPON Resin 863, EPON Resin 872, EPON™ Resin SU-8, EPON™ Resin SU-3, Heloxy modifiers, and combinations thereof, as well as other epoxy resins all available from Momentive Specialty Chemicals Inc., of Columbus Ohio. The fluorine-free versions of the above epoxy materials may be used as the polymeric materials as described herein.

Suitable acrylate materials include polyacrylics, polyacrylates, polyacrylamides, polyester acrylates, epoxy modified acrylates, urethane acrylates oligomers, and combinations thereof. Examples of acrylate materials include 2-hydroxy ethyl methacrylate (HEMA), 2-hydroxy ethylacrylate, n-butyl acrylate, methylmethacrylate, poly methyl methacrylate (polyPMMA), and combinations thereof. Such acrylate materials have been observed to be of a hydrophilic nature. The acrylate materials may be in the form of a co-polymer, such as a copolymer of HEMA and the more hydrophobic methylmethacrylate.

Alternatively, to create a more hydrophobic surface, a material like polyPMMA (water contact angle of 70° to 75°) could be blended with a small amount of a fluorinated, perfluorinated or semifluorinated material (0.01% to 5% by weight) to create a more hydrophobic material (water contact angle of 90°-160°).

Alternatively, in order to decrease the water wettability (increase the water contact angle), perfluorinated or semifluorinated acrylate could be copolymerized with a monomer such as methylmethacrylate. Examples of fluorinated acrylates include 1H,1H-perfluorooctyl acrylate, 1H,1H,2H,2H-perfluorooctyl acrylate 1,1,1,3,3,3-hexafluoroisopropyl acrylate, 1H,1H,7H-dodecafluoroheptyl methacrylate, 1H,1H,5H-octafluoropentyl acrylate, 2,2,2-trifluoroethyl acrylate, 2,2,2-trifluoroethyl methacrylate, pentafluorophenyl acrylate, pentafluorophenyl methacrylate, and combinations thereof, among other fluorinated acrylates and methacrylates.

Alternatively, methacrylate and acrylate functional siloxanes could be polymerized with or without monomers, such as methylmethacrylate, to decrease the water wettability. Examples of such compounds include methacryloxypropyl terminated polydimthylsiloxanes, (3-acryloxy-2-hydroxypropyl) terminated polydimethylsiloxane, acryloxy terminated dimethylsiloxane-ethyleneoxide block copolymers, (methacryloxypropy)methylsiloxane-dimethylsiloxane copolymers, (acryloxypropyl)methylsiloxane-dimethylsiloxane copolymers, monomethacryloxypropyl terminated polydimethylsiloxane, and monomethacryloxy-monotrimethylsiloxy terminated polyethylene oxide, methacrylate $T_8$ cubes (POSS monomers), and combinations thereof.

Suitable polyamides include Nylon 6, Polyamide 612, Polyamide 12, polyether block amides (PEBA), aromatic polyamides, and combinations thereof. Examples of polyamides include Vestamid L (available from Evonik of Mobile, Ala.), Rilsan PA11 (from Arkema of Pasadena, Tex.), PA-6T Amodel resins (from Amoco), Pebax polyether block amides (available from Elf Atochem), and combinations thereof. Alternatively, the polyamide material may also include polyimides. An example of a polyimide material is Kapton HN available from DuPont.

Other surface wettability modifiers may be selected from the group consisting of glycols, ethylene oxides, propylene oxides, and combinations thereof, which may be used in combination with or as a substitute for the surface wettability modifiers described herein.

Examples of surface wettability modifiers may include compounds selected from the group consisting of polydimethylsiloxane, polyalkyleneoxidi methylsiloxane copolymer, siloxane polyalkyleneoxide copolymer, a polyether polymer fluorosurfactant, 2-hydroxy ethyl methacrylate (HEMA), 2-propenoic acid, 2-[methyl[(nonafluorobutyl)sulfonyl]amino]ethyl ester, triethoxysilylpropoxy(hexaethyleneoxy) dodecanoate, triethoxysilylpropoxy(triethyleneoxy)octadecanoate, tridecafluorooctyltriethoxysilane or heptadecafluorodecyltrimethoxysilane, and combinations thereof.

It is believed that the surface wettability modifiers alter the surface wettability, the surface energy, or both, of the proppant material from the original condition. The surface wettability modifiers may modify the proppant material by imparting hydrophobic or hydrophilic characteristics to the proppant material surface. By appropriately selecting the surface wettability modifier, the proppant material surface may be tailored to achieve a water-wet, oil-wet, or intermediate-wet condition as desired. Increasing (more) water-wettable corresponds to lower water contact angles towards 0°, and decreasing (less) water-wettable corresponds to a higher contact angle towards 90°. In one embodiment, the wettability modifiers alter the surface wettability of the proppant material to be less water wettable, and thus, provide a higher contact angle.

With regard to the materials described herein, appropriately modified silanes, silicon-containing/modified materials, fluorine-containing/modified materials, and combinations thereof, are expected to impart hydrophobicity and make the surface of a water-wet propping agent more neutral-wet or oil-wet. Standard resins (non-fluorinated/fluorine-modified and non-silicon containing/modified) of any type as described above for the polymeric material may provide water contact angles of 0° to 75°.

A blend of the polymeric material described herein (non-fluorinated and non-siloxane/non-silane containing/modified) with the surface wettability modifiers described herein, such as the fluorinated/fluoro-modified or siloxane containing/modified will enable contact angles of greater than 75°, with highly fluorinated or perfluorinated materials being required to produce superhydrophobic surfaces with water contact angles greater than 150°. In general terms, monomers and polymers with hydrophilic groups may provide hydrophilic surfaces with low water contact angles. For example, acrylates with hydroxyethyl functionalities (2-hydroxy ethyl methacrylate (HEMA), 2-hydroxy ethylacrylate) may provide a hydrophilic surface with a low water contact angle.

Conversely, hydrophilic materials, such as glycols, ethylene oxides, propylene oxides, and hydrophilic polyacrylics and polyacrylates, are expected to make the surface of neutral-wet and oil-wet propping agents more water-wettable. However, silanes, other silicon-containing materials, and fluorine-containing materials that impart water-wettability can also be selected, as can polyacrylics, polyacrylates, polyamides, epoxies, and polyacrylamides that impart water repellency or intermediate to oil wettability.

It is believed that the ability of a silane to generate a hydrophobic surface are its organic substitution, the extent of surface coverage, residual unreacted groups (both from the silane and the surface) and the distribution of the silane on the surface. Aliphatic hydrocarbon substituents or fluorinated hydrocarbon substituents are the hydrophobic entities which enable silanes to induce surface hydrophobicity. For example, similarly methyl-substituted alkylsilanes and fluorinated alkylsilanes provide better hydrophobic surface treatments than linear alkyl silanes. Thus, it is believed that polymeric materials described herein that are modified with aliphatic hydrocarbon substituents, partially or completely fluorinated hydrocarbon substituents, or siloxane substituents should induce surface hydrophobicity due to the presence of the hydrophobic substituents of the modified resin.

It is believed that a successful hydrophobic coating may eliminate or mitigate hydrogen bonding and shield polar surfaces from interaction with water by creating a non-polar interphase. Hydroxyl groups are the most common sites for hydrogen bonding. The hydrogen atoms of hydroxyl groups may be eliminated by oxane bond formation with an organosilane. Similarly, the hydrophobic substituents of an appropriately modified resin as described above prevent exposure of inner materials having polar surfaces (for example, the inner phenolic polymeric material) from interaction with water by creating a non-polar interphase (a non-polar outer surface with water contact angle of about 70°-180°).

Hydrophobicity is frequently associated with oleophilicity (oil-wettability), the affinity of a substance for oils, since nonpolar organic substitution is often hydrocarbon in nature and shares structural similarities with many oils. The hydrophobic and oleophilic effect may be differentiated and controlled. At critical surface energies of 20-30 mJ/m$^2$, surfaces are wetted by hydrocarbon oils and are water repellent. At critical surface energies below 20 mJ/m$^2$, hydrocarbon oils no longer spread and the surfaces are both hydrophobic and oleophobic. The most oleophobic silane surface treatments have fluorinated long-chain alkyl silanes and methylated medium chain alkyl silanes. For the surface wetting modifiers described herein, the most oleophobic surface treatments are believed to consist of materials modified with fluorinated long-chain alkyl and/or polyakylsiloxanes.

The polymeric materials and/or the surface wettability modifiers of the invention may include a wide variety of additive materials for tailoring properties.

In the practice of this invention, coupling agents may be employed to promote adhesion of the coating to substrate. It is desirable to include a silane additive to ensure good bonding between the polymeric materials and the substrate as a coupling agent. The use of organofunctional silanes as coupling agents to improve interfacial organic-inorganic adhesion is especially preferred.

Such coupling agents include, for example, organo silanes which are known coupling agents. The use of such materials may enhance the adhesion between the binder and the filler. Examples of useful coupling agents of this type include amino silanes, epoxy silanes, mercapto silanes, hydroxy silanes and ureido silanes. The use of organofunctional silanes as coupling agents to improve interfacial organic-inorganic adhesion is especially preferred. These organofunctional silanes are characterized by the formula XI:

VII: $R^{13}$—Si—$(OR^{14})_3$     XI, where $R^{13}$ represents a reactive organic function and $OR^{14}$ represents a readily labile alkoxy group such as $OCH_3$ or $OC_2H_5$. Particularly useful for coupling phenolic or furan resins to silica are the amino functional silanes of which Union Carbide A1100 (gamma aminopropyltriethoxysilane) is an example. The silane may be premixed with the resin or added to the mixer separately.

The polymeric materials and/or the surface wettability modifiers can optionally contain additives such as silicone lubricants, surfactants, impact modifiers, wetting agents, dyes, pigments, flow modifiers (such as flow control agents and flow enhancers), hardeners, crosslinking agents, foaming agents, initiators, thermal stabilizers, light stabilizers, antioxidants, flame retardants, anti-drip agents, antiozonants, stabilizers, anti-corrosion additives, mold release agents, fillers, anti-static agents, waxes, and the like, or combination comprising at least one of the foregoing. In one embodiment, a dye or pigment may be added to polymeric materials and/or the surface wettability modifiers.

The surfactants may be anionic, nonionic, cationic, amphoteric or mixtures thereof. Certain surfactants also operate as flow control agents. Any surfactant materials that may added include materials other than the surface wettability modifiers described herein.

Other optional additives include liquid toughening agents, humidity resistant additives or hot strength additives. Of course, the additives may be added in combination or singly.

Elasticizers or plastizers, such as bisphenol A or cashew nut oil, may also be present to enhance the resin (binder) elasticity or plasticity. Other known additives may also be present.

It is optional to add a lubricant to the mixture of substrate and resin before the mixture "breaks down" into free flowing curable coated particles. The lubricant is preferably one that is liquid at the mixing temperature and has a sufficiently high boiling point so that it is not lost during the mixing process. Suitable lubricants include vegetable oil, for example, soy or corn oil, low vapor pressure lubricating oil, liquid silicone such as Dow Corning SILICONE 200, mineral oil, paraffin wax, petrolatum, or the synthetic lubricant ACRAWAX CT (a bis-stearamide of a diamine, available from Henkel International of Germany or Lonza of Switzerland).

As stated above, the polymeric coating can optionally contain an impact modifier. An impact modifier can impart elastic properties to the polymeric coating. Suitable impact modifiers include natural and synthetic elastomeric polymers, typically derived from such monomers as olefins (for example, ethylene, propylene, 1-butene and 4-methyl-1-pentene), alkenylaromatic monomers (for example, styrene and α-methylstyrene), conjugated dienes (for example, butadiene, isoprene and chloroprene), and vinylic carboxylic acids and their derivatives (for example, vinyl acetate, acrylic acid, alkylacrylic acids, ethyl acrylate, methyl methacrylate and acrylonitrile). They include homopolymers and random, block, radial block, graft and core-shell copolymers or a combination comprising at least one of the foregoing.

A typical impact modifier is a polyalcohol, also known as a polyol. A particularly useful class of impact modifiers comprises the AB (diblock) and ABA (triblock) copolymers and core-shell graft copolymers of alkenylaromatic and diene compounds, especially those comprising styrene and either butadiene or isoprene blocks. The conjugated diene blocks may be partially or entirely hydrogenated, whereupon they may be represented as ethylene-propylene blocks and the like and have properties similar to those of olefin block copolymers. Examples of suitable triblock copolymers of this type are polystyrene-polybutadiene-polystyrene (SBS), hydrogenated polystyrene-polybutadiene-polystyrene (SEBS), polystyrene-polyisoprene-polystyrene (SIS), poly(α-methylstyrene)-polybutadiene-poly(α-methylstyrene) and poly(α-methylstyrene)-polyisoprene-poly(α-methylstyrene). Particularly preferred triblock copolymers are available commercially as CARIFLEX®, KRATON D®, and KRATON G® from Shell.

Also suitable as impact modifiers are core-shell type graft copolymers and ionomer resins, which may be wholly or partially neutralized with metal ions. In general, the core-shell type graft copolymers have a predominantly conjugated diene or crosslinked acrylate rubbery core and one or more shells polymerized thereon and derived from monoalkenylaromatic and/or acrylic monomers alone or in combination with other vinyl monomers. Other impact modifiers include the above-described types containing units having polar groups or active functional groups, as well as miscellaneous polymers such as Thiokol rubber, polysulfide rubber, polyurethane rubber, polyether rubber (for example, polypropylene oxide), epichlorohydrin rubber, ethylene-propylene rubber, thermoplastic polyester elastomers, thermoplastic ether-ester elastomers, and the like, as well as mixtures comprising any one of the foregoing. A suitable impact modifier amongst the ionomer resins is SURLYN® available from Du Pont.

The following parameters may be useful when characterizing particles of the present invention.

The polymeric material and the substrate may be delivered to the mixing device to provide a weight ratio of polymeric material (on a water free basis) to uncoated substrate of about 1 to 5 parts polymeric material: 95 parts uncoated substrate or about 2 to 4 parts polymeric material: 95 parts uncoated substrate. The amount of polymeric material is determinable by measuring Loss-on-Ignition (LOI). Preferably sufficient polymeric material is applied to the substrate to achieve an LOI (based on combined coating weight) of from at most about 5 weight percent, preferably about 1 to about 5 weight percent, more preferably about 2 to about 4 weight percent due to the single layer of precured polymeric material.

LOI is typically determined in a two hour furnace test, starting by pre-conditioning a series of crucibles with lids in a furnace pre-heated to 1700° F. (927° C.). Then the crucible with the lid is placed in the furnace at 1700° F. (927° C.), the furnace is allowed to heat back up to 1700° F. (927° C.), and the crucible with the lid is maintained at 1700° F. (927° C.) for 15 minutes. The pre-conditioned crucibles and lids are placed in a desiccator containing standard desiccants and allowed to cool to room temperature. Then the conditioned crucible with the lid is weighed and approximately 8 grams of polymeric material-coated sand are placed in the crucible. Then the crucible with the lid and the sample is reweighed. Then the covered crucible and sample are placed in the furnace at 1700° F. (927° C.), the furnace is allowed to heat back up to 1700° F. (927° C.), and the samples are kept in the furnace for 2 hours after the furnace temperature has returned to 1700° F. (927° C.). Then the crucible with lid and sample are transferred to the desiccator and allowed to cool to room temperature. Re-weigh the cooled crucible with lid containing the sample of sand, using the analytical balance. Calculate the loss-on-ignition for each sample as the difference between the original and final sample weight.

The surface wettability modifier may be added to form from about 0.01% to about 5.0% by weight, such as from about 0.05% to about 1% by weight, for examples, from about 0.1% to about 1.0% by weight, of the proppant material.

The polymer material coated substrate generally has an average particle size of about 200 to about 2,000 micrometers (about 70 mesh to about 10 mesh). In one embodiment, the polymer material coated substrate has an average particle size of about 300 to about 1,000 micrometers (about 50 mesh to about 18 mesh). In another embodiment, the polymer material coated substrate has an average particle size of about 350 to about 650 micrometers (about 45 mesh to about 28 mesh). The polymer material coated substrate can have bimodal or higher distributions. The most common size designations are 20/40, 16/30, 30/50 and 40/70.

The formed proppant material may have a water contact angle from about 59° to about 120°, such as from greater than 75° to about 110°, for example, from greater than 75° to about 95°, or from about 76° to about 87°. The water contact angle may be determined by a force tensiometer by the Washburn method as known in the art.

The formed proppant material may have a surface energy from about 50 mJ/m$^2$ or less, such as from about 20 mJ/m$^2$ to about 50 mJ/m$^2$, for example, from about 30 mJ/m$^2$ to about 40 mJ/m$^2$. The surface energy may be determined from a set of liquid/solid contact angles, developed by bringing various liquids in contact with the solid. A prior knowledge of the surface tension values for the liquids is necessary. The most widely used two component surface energy theory is Fowkes theory, which describes the surface energy of a solid as having a dispersive and a polar component. One method to determine surface energy is found in Application Note 401, "So You Want to Measure Surface Energy?", by Christopher Rulison of Augustine Scientific of Newbury, Ohio, 2002.

The proppant material may have an upper material surface as described herein, formed from the polymeric material, the surface wettability material, or both, with a bond strength from 10 psi to about 1000 psi, such as from about 80 psi to 300 psi, for example, from about 100 psi to about 200 psi. The bond strength is measured by the unconfined compressive strength (UCS). In one embodiment described herein, curable is any surface material having a UCS Bond Strength of 10 psi or greater, such as from 10 psi to about 300 psi or more. Alternatively, the proppant material may have a bond strength of less than 10 psi for precured embodiments of the proppant material.

To determine bond strength of polymeric material-coated proppant at simulated downhole conditions under atmospheric pressure by a procedure including: preparing liquid media (2% KCl) and proppant/fluid slurry, molding or forming of resin coated proppant (RCP) cores for consolidation and/or curing, consolidating and/or curing the proppant, measuring strength of consolidated cores, and calculating and reporting the results.

The molded specimens made according to this procedure are suitable for measurement of Brazilian tensile strength and/or unconfined compressive strength (UCS) test of ASTM D 2938-91 or ASTM D 2938-95 Standard Test Method for Unconfined Compressive Strength of Intact Rock Core Specimens. For compressive strength measurements, the test specimen shall be cut to a length of at least 2.25 inches (57.2 mm), a length to diameter ratio of at least 2 to 1, and then broken according to ASTM D 2938-91 Standard Test Method for Unconfined Compressive Strength of Intact Rock Core Specimens. For Brazilian tensile strength measurements, the test specimen shall be cut to a length of at least 0.56 inch (14.2 mm) but not more than 0.85 inch (21.6 mm), a length to diameter ratio of at least 0.5-0.75 to 1, according to ASTM D 3967-92 Standard Test Method for Splitting Tensile Strength of Intact Rock Core Specimens.

Precured coatings are coatings such that the coated particles do not have the ability to generate significant particle to particle bond strength, thus less than 10 psi bond strength when subjected to moderate conditions of temperature (<200° F.) and atmospheric pressure closure stress. Typically the wet compression test is performed on a 12 pounds per gallon slurry in 2% KCl. However, a precured resin coating does not mean the coating has zero curability left in it.

In one embodiment of the proppant material, the proppant material may have a water contact angle of about 90° and a surface energy of about 35 mJ/m$^2$, and optionally, a minimum bond strength of about 50 psi.

Proppant material may be used to increase production of oil and/or gas by providing a conductive channel in the formation. Fracturing of the subterranean formation is conducted to increase oil and/or gas production. Fracturing may be performed by the injection of a fluid (either a hydrocarbon, water, foam or emulsion) into a formation at a rate that exceeds the formation's ability to accept the flow. The inability for the formation to dissipate the fluid results in a buildup of pressure. When this pressure buildup exceeds the strength of the formation rock, a fracture is initiated. Continued pumping of the fracturing fluid will result in the fracture growing in length, width and height. The rate required to initiate and extend the fracture is related to the injection rate and viscosity of the fracturing fluid. This combination of injection rate and fluid viscosity is also a critical factor in the ability of the fracturing fluid to transport the proppant material to the most distant points of the fracture geometry being created.

During fracture formation, the proppant materials may be placed in the formation to maintain the fracture in a propped condition when the injection pressure is released. As the fracture forms, the proppant materials are carried into the fracture by suspending them in additional fluid or foam to fill the fracture with a slurry of proppant materials in the fluid or foam. Upon ceasing the injection of fluid, the proppant materials form a pack that serves to hold open the fractures. Additionally, it is believed that curable proppant materials (or partially curable proppant materials) would be expected to form a consolidated pack.

The propped fracture thus provides a highly conductive channel in the formation using the proppant materials described herein. The degree of stimulation afforded by the hydraulic fracture treatment is largely dependent upon formation parameters, the fracture's permeability, the propped fracture length, propped fracture height and the fracture's propped width.

In one embodiment of the present invention, the proppant materials are used in a method of forming a proppant pack including suspending the above-described free flowing precured particles in a carrier fluid to form a suspension and injecting the suspension into a subterranean formation.

It is believed that conventional sand proppant materials, including in the form of proppant packs, disposed in fracture formations results in water adhesion to the surface of the sand proppant materials, which are considered water wet. Hydrocarbon material, such as oil, has a reduced flow through the proppant materials because the water is not fully displaced. It is believed that the proppant materials as described herein can be formed to provide for optimized wettability in water and in hydrocarbons, such as oil. In some embodiments, it is believed that water has reduced or minimal bonding to the surface of the proppant materials, allowing clear pathways for hydrocarbon flow through and around the proppant materials; and it is believed that the hydrocarbon material does not bond to the surface of the proppant material, allowing for improved hydrocarbon flow through and around the proppant materials. It is believed this theory is corroborated by the information in the examples below.

To make a proppant material of a substrate materials coated with the polymeric coating as described herein, and optionally, the surface wettability modifier as described herein, and, further optionally, any additives are mixed at conditions to provide a coating composition. The process to form the proppant material may be a batch process, a semi-continuous process, or a continuous process.

In one embodiment of the formation process, a substrate material, such as sand, is heated to a temperature above 300° F. (149° C.), and may be less than about 440° F. (226° C.), and introduced into a mixing device. Depending on the exact charges of resin, a more curable coating is obtained at the lower starting sand temperatures (SSTs) and precured coatings are obtained at higher SSTs. For example, the SST for one precured proppant material is about 440° F. Next the polymeric material, such as a liquid phenolic resin, and any additives, such as a coupling agent, are added while mixing. Next, additional polymeric material, such as solid phenolic resin and liquid phenolic resin, are added while mixing. Next a surface wettability modifier is added while agitation is continued. Finally, the batch is cooled through the addition of water and mixing continued to obtain free-flowing particles of coated proppant.

In one embodiment, there may be two or more separate water additions, and optionally in another embodiment, no water additions. In the embodiment with two or more water additions, the water addition is believed to stop or reduce any significant curing reaction, so that the desired stage of the reaction can be "trapped." The addition of water is believed to allow for the formation of a curable upper material layer of the polymeric material, the surface wettability modifier, or combinations thereof. In the case of a precured proppant material, limited or no water may be added and any residual heat can continue to drive the curing reaction to make the precured product.

The mixing can take place in a device that uses shear force, extensional force, compressive force, ultrasonic energy, electromagnetic energy, thermal energy or a combination comprising at least one of the foregoing forces and energies. The mixing is conducted in processing equipment wherein the aforementioned forces are exerted by a single screw, multiple screws, intermeshing co-rotating or counter rotating screws, non-intermeshing co-rotating or counter rotating screws, reciprocating screws, screws with pins, barrels with pins, screen packs, rolls, rams, helical rotors, or a combination comprising at least one of the foregoing. Exemplary mixing devices are EIRICH™ mixer, WARING™ blenders, HENSCHEL™ mixers, BARBER GREEN™ batch mixers, ribbon blenders, or the like.

If a profiled rotating drum is employed as the mixer for coating, this rotating drum apparatus typically has a rotation speed of 16-20 rotations/min. The polymeric material stream may be preheated, for example, to 122-140° F. (50-60° C.) for an epoxy resin, and sprayed into the rotating drum apparatus (containing the formed particles) through a nozzle with air atomizing. This rotating drum apparatus operates as a batch process with a process time of about 5 to 20 minutes.

If an Eirich mixer is employed as the mixer for coating, it typically operates at a vessel rotation speed of 20-40, typically 30-35, revolutions per minute (rpm), with a process time of 2-10 minutes, preferably 2-5 minutes. However, if desired the Erich standard foundry mixer may operate at 20 to 80, for example, 50 to 80 rpm. If desired a coupling agent, such as silane, is added to the sand in the mixer and, about 10 to 20, for example 15, seconds after the silane, then the liquid polymeric material is added. In the alternative, the silane could be premixed into the polymeric material.

The coated particles are discharged from the mixer and pass through a screen and the desired particle sizes of proppant are recovered. The particles are agitated during curing.

The surface wettability modifier may be added to the mixture in the mixer, or at any other subsequent step, such as prior to or during a curing process. Optionally other additives (not shown) may be added to the mixture in the mixer. Alternatively, the surface wettability modifier may be added to a liquid resin, such as a resole, or a solid novolac resin prior to initiating the coating process.

Alternatively, no heat is added during these mixing, coating and curing steps, with the proviso that optionally the substrate or coated substrate is heated to some nominal temperature, for example, in the range of 65° F. to 100° F. to standardize a formula and cycle time for a continuous process. This would eliminate issues around cycle time changes related to ambient conditions such as outside temperature (where substrate is stored) in winter time.

The coated particle stream is typically sent to classification to collect coated substrate having the desired particle size. A typical sieving apparatus is a vibration sieve. Sieved particles of predetermined mesh size range are discharged as a sieved stream. A typical coated particle desired size range is 20 to 40 mesh. Over-sized and undersized particles are screened off and considered waste.

In an embodiment of a production process, substrate material is coated in a continuous system. Substrate material enters an elongate (for example, 20 foot long) horizontal mixer containing two horizontally mounted shafts having paddles to promote mixing the ingredients and moving them horizontally along the mixer. If employed the optional silane is immediately added and then the polymeric material mixture, which for example, may contain an epoxy material or phenolic-formaldehyde material, are added. This mixture travels down the mixer. The total time in the mixer can range from about 3-10 minutes depending on desired throughput rate.

In one embodiment of a continuous coating system in which substrate material and polymeric material are fed to the long horizontal oriented mixer that may be of varying length and diameter. The embodiment of the continuous coating system has from two to four horizontal shafts that run the length of the mixer. Along the shaft there are positioned a multiple sets of mixing paddles mounted on the shaft. The paddles are oriented so as to insure both mixing and the transport of the substrate from the beginning of the mixer to its exit point. At various points along the mixer are positioned addition ports so chemicals may be added at prescribed rates and times. For example, there may be addition ports for additives and surface wettability modifiers as described herein.

The proppant materials, as described in this invention may be injected into the subterranean formation as the sole proppant in a 100% proppant pack (in the hydraulic fracture) or as a part replacement of existing commercial available ceramic and/or sand-based proppants, polymeric material-coated and/or uncoated, or as blends between those, for example, coated particles are 10 to 50 weight % of the proppant injected into the well. For example, the uncoated proppant materials may be first placed in a well, and afterwards a curable proppant materials (of the present invention) may be placed in the fracture that is closest to the wellbore or fracture openings. This type fracturing treatment in done without stopping to change the proppant and is know in the industry as a "tail-in treatment".

The following examples, which are meant to be exemplary, not limiting, illustrate compositions and methods of manufacturing of some of the various embodiments of the coated particles described herein.

EXAMPLES

The following examples serve to illustrate the present invention. Unless otherwise indicated all parts and percentages are by weight, and all screen mesh sizes are U.S. Standard Screen sizes.

In the Examples, the following compounds were used as described. FF-160 is trifluoropropylmethyl siloxane. SM-2162 is a polydimethylsiloxane emulsion. SM-2164 NPF is an alkyl-aryl polydimethylsiloxane emulsion. SM-2169 is a polydimethylsiloxane emulsion. Y-12560 is an organomodified polydimethylsiloxane. Y-17233 is a siloxane polyalkyleneoxide co-polymer. Y-17260 is an alkyl modified siloxane. Y-17261 is an alkyl modified siloxane. Y-17424 is a polyalkyleneoxide modified polydimethylsiloxane. Y-17420 is an organomodified polydimethylsiloxane. Y-17557 is an aminosilicone polyether copolymer. Y-17712 is an organomodified silicone emulsion. Y-17713 is an organomodified silicone emulsion. Magnasoft™ material is an aminomodified polydimethylsiloxane. Magnasoft™ SilQ is a silicone fluid containing a silicone polyether quartenary amine. Silbreak™ 321 demulsifier is a polyalkylenedimethylsiloxane copolymer. Silbreak™ 400 is an organomodified polymethylsiloxane. Silwet™ L-7510 is a siloxane polyalkyleneoxide copolymer. Silwet™ L-7604 is a siloxane polyalkyleneoxide copolymer. Silwet™ L-7605 is a polyalkyleneoxide modified polydimethylsiloxane. Silwet™ L-8500 is a siloxane polyalkyleneoxide copolymer. All of the foregoing materials are commercially available from by Momentive Performance Materials Inc, of Friendly, W. Va. or Waterford, N.Y.

FC-4430 is a 2-propenoic acid, 2-[methyl[(nonafluorobutyl)sulfonyl]amino]ethyl ester, telomer with methyloxirane polymer with oxirane di-2-proenoate and methyloxirane polymer with oxirane mon-propenoate material, which is commercially available from 3M of St. Paul, Minn. SIT 8176 is a tridecafluoro-1,1,2,2-tetrahydrooctyl trimethoxysilane of Gelest, Inc., of Morrisville, Pa.

S-2005 is a fluoroalkyl methacrylate copolymer emulsion, which is commercially available from Daikin America of Orangeberg, N.Y. S-2023B is a fluoroalkyl acrylate copolymer emulsion, which is commercially available from Daikin America of Orangeberg, N.Y. S-2042 is a fluoroalkyl acrylate copolymer emulsion, which is commercially available from Daikin America of Orangeberg, N.Y. S-2059B is a fluoroalkyl acrylate copolymer solution, which is commercially available from Daikin America of Orangeberg, N.Y.

The 40/70 examples were prepared as follows. A substrate material having 40/70 mesh sizes was added to a reactor and heated with a propane flame to a temperature of about 380° F. at atmospheric pressure. The substrate was added at about 1000 grams. Next, a portion of a liquid polymeric material of resole phenol-formaldehyde was added at about 10.3 grams. An additional amount of about 3.2 grams of a second liquid polymeric material of a terpolymer of phenol-formaldehyde-furfuryl alcohol was then added to the mixture. Additional materials of about 0.4 grams of a silane additive, for example, A-1100, about 0.55 grams of ammonium chloride, (10% $NH_4Cl$), which is an acid catalyst for the cure of the second liquid polymeric material, and about 6.2 grams of a novolac phenol-formaldehyde material, such as SD-672D, were then added sequentially to the mixture. Additional polymeric material of resole phenol-formaldehyde of about 8.0 grams was then added to the mixture. All trade-named materials are commercially available from Momentive Specialty Chemicals Inc., of Columbus, Ohio or Momentive Performance Materials Inc., of Albany, N.Y. SD-672D is commercially available from Momentive Specialty Chemicals Inc., of Louisville, Ky.

Next, the surface wettability modifier was added in an amount to provide about 1 gram of solid material. A total amount of about 11 grams of water was added over two separate additions to the mixture. For some examples, the Y-17712 and Y-17713 examples, less than 11 grams of water was added here, because part of the 11 grams was added at the time of the surface wettability modifier, which in these two cases are aqueous dispersions that had to be added in amounts greater than 1 gram to achieve the addition of 1 gram of solid material. The substrate was stirred continuously throughout the various additions. Stirring was continued after the water additions until the mass broke up into free-flowing particles. The resulting mixture was discharged and the proppant material analyzed. The results of the Examples are shown in Table 1.

The 20/40 examples were prepared as follows. A substrate having 20/40 mesh sizes was added to a reactor and heated to a temperature of about 390° F.-405° F. with a propane flame at atmospheric pressure. The substrate was added at about 1000 grams. After the substrate was heated to the appropriate temperature, a polymeric material of a liquid polymeric material of resole phenol-formaldehyde was added at about 15.1 grams. Next, additional materials of about 0.4 grams of a silane additive, for example, A-1100, was added, about 6.2 grains of the liquid polymeric material of resole phenol-formaldehyde, and about 18.55 grams of a novolac phenol-formaldehyde material, such as SD-672D, were then added sequentially to the mixture.

The surface wettability modifier was added in an amount to provide about 1 gram of solid material. A total amount of about 24 grams of water was added over two separate additions to the mixture. The substrate was stirred continuously throughout the various additions. Stirring was continued after the water additions until the mass broke up into free-flowing particles. The resulting mixture was discharged and the proppant material analyzed. The results of the Examples are shown in Table 1

A white frac sand coated with a polymeric material without a surface wettability modifier was used as the control for the 40/70 mesh samples. A brown frac sand coated with a polymeric material without a surface wettability modifier was used as the control for the 20/40 mesh samples. The white frac sand is commercially available from Unimin Corporation of Ottawa, Minn. or Badger Mining Corporation of Berlin, Wis. The brown frac sand is commercially available from Unimin Corporation of Voca, Tex.

The polymeric material is a combination of the following materials, a liquid phenol-formaldehyde resole, used under the tradename of Oil Well Resin (OWR) 9200, with the polymer material of a terpolymer of phenol, formaldehyde and furfuryl alcohol, used under the tradename of Oil Well Resin (OWR) 685D, and a phenol-formaldehyde novolac polymeric material, used under then tradename SD-672D, and the combination of material was used as the polymeric material in all of the examples. OWR 9200 and OWR 685D are commercially available from Momentive Specialty Chemicals Inc., of Louisville, Ky. SD-672D is commercially available from Momentive Specialty Chemicals Inc., of Louisville, Ky.

The proppant materials were tested or calculated as follows. 900 g of a proppant material was placed in a glass column A two pore volume of water was poured into the column. At least one pore volume of water was drained until there is no free water above the proppant pack. Two pore volume of Isopar™ L fluid was poured into the column. Isopar™ L fluid is a synthetic isoparaffinic hydrocarbon solvent commercially available from ExxonMobil Chemical. Once at least one pore volume of Isopar™ L fluid is collected, the flow test was performed by measuring flow rate in mL/minute. Duplicate tests were performed and a report average flow rate was determined as shown below. Pore volume is the volume of porosity in the proppant column. It was estimated that the pore volume was about 35% of the proppant material volume.

The test is further detailed as follows. Weigh 900 g of sample (Sand and Resin Coated Proppant ONLY). Calculate the volume of sample used (mass of sample×pipe fill sample). Record the mass and the volume of the sample used. Place the glass wool (0.76 g) in the glass column before packing the sample. Weigh and record the mass of 2 empty beakers. One beaker is used to collect one pore volume of water and another to collect one pore volume of Isopar™ L fluid. Weigh out two pore volumes of water (35% of the sand volume that is used). Ensure the stopcock is opened and then pour 2 pore volumes of water into the column Open the stopcock to drain one pour volume of water out. If the free water level is running low before one pore volume of water is collected, add additional 100 g of water may be used. Use a thin wire to pack the column to remove air pockets. Continue packing until a resistance from the pack is felt. Drain out the free water sitting above the pack. Record the mass of water collected. Weigh out 2 pore volumes of Isopar™ L fluid. Place 2 pore volumes of Isopar™ L fluid into the column Collect and record the remaining water that is being displaced by Isopar™ L fluid. At some point, both water and Isopar™ L fluid will move through the column together, start collecting the Isopar in a pre-weighed empty beaker. Collect one pore volume of Isopar™ L fluid. If the free Isopar™ L fluid level is running low before the one pore volume of Isopar™ L fluid is collected, add additional 70 g of Isopar™ L fluid.

Use the separatory funnel to obtain the additional water that is being displaced. Record the mass of water as it would be needed to calculate the residual water left in the pack. Once one pore volume of Isopar™ L fluid is collected, perform the flow test. Before the flow test is start, make sure that the height of the head pressure is 8.5 cm. If it is not, add more Isopar™ L fluid and record the mass of Isopar™ L fluid added. Use a beaker of a known mass and collect the Isopar™ L fluid for about t minutes. Calculate the total mass of Isopar™ L fluid collected and then convert it into volume. The flow rate is obtained by dividing volume collected by t minutes. To calculate residual water left in the pack, add up the total amount of water collected from the various steps. Subtract the total amount of water collected from the total amount of water used to obtain the amount of residual water in the pack.

Table 1 has results of oil flow tests comparing uncoated white sand proppant (control) to resin coated proppant with various surface wettability modifiers. In all tests, resin coated proppant with surface wettability modifiers had high oil flow compared to the control sample of uncoated Northern White sand proppant. The sand and ceramic listed below are uncoated substrate materials as described herein. The control is a white sand coated with a novolac phenol-formaldehyde resin and a resole phenol-formaldehyde resin, without the addition of a surface wettability modifier.

TABLE 1

| Examples | Surface Wettability Modifier | Flow Rate Average mL/min | UCS Bond Strength psi | Water contact Angle (°) | Overall surface energy (mJ/m$^2$) |
|---|---|---|---|---|---|
| 40/70 Mesh | | | | | |
| 1 | Y-17712 | 33.83 | 219 | 83.30 | 32.21 |
| 2 | S-2042 | 31.60 | 165 | 82.40 | 33.02 |
| 3 | Y-17260 | 31.34 | 138 | 86.30 | 30.23 |
| 4 | Y-17233 | 30.19 | 144 | 80.80 | 34.20 |
| 5 | L-7604 | 30.16 | 208 | 76.80 | 36.35 |

TABLE 1-continued

| Examples | Surface Wettability Modifier | Flow Rate Average mL/min | UCS Bond Strength psi | Water contact Angle (°) | Overall surface energy (mJ/m²) |
|---|---|---|---|---|---|
| 6 | Y-17713 | 28.88 | 282 | 86.50 | 30.34 |
| 7 | SM2169 | 27.99 | 192 | 85.20 | 31.19 |
| 8 | Y-17557 | 25.74 | 194 | 82.70 | 32.79 |
| 9 | Y-17424 | 25.13 | 147 | 80.40 | 34.27 |
| 10 | SM2164 NPF | 24.31 | 232 | 77.40 | 36.17 |
| 11 | Y-17420 | 24.30 | 119 | 76.40 | 34.79 |
| 12 | Silbreak 321 | 24.05 | 185 | 81.20 | 34.13 |
| 13 | L-8500 | 23.69 | 186 | 76.10 | 37.00 |
| 14 | S-2005 | 23.41 | 189 | 84.10 | 31.87 |
| 15 | L-7605 | 23.29 | 267 | 85.70 | 30.86 |
| 16 | SM2162 | 22.91 | 199 | 83.90 | 32.02 |
| 17 | FC-4430 | 22.49 | 197 | 80.80 | 33.99 |
| 18 | Y17261 | 22.37 | 247 | 82.80 | 32.71 |
| 19 | L-7510 | 22.18 | 156 | 81.10 | 33.80 |
| 20 | S-2023B | 21.52 | 162 | 81.00 | 33.88 |
| 21 | Magnasoft SilQ | 21.38 | 87 | 82.00 | 33.21 |
| 22 | FF-160 | 18.82 | 207 | 83.70 | 32.14 |
| 23 | Silbreak 400 | 18.42 | 292 | 79.00 | 35.15 |
| 24 | Y-12560 | 18.16 | 207 | 80.90 | 33.91 |
| 25 | SIT 8176.0 | 16.07 | 136 | 81.70 | 33.41 |
| 26 | S-2059B | 15.91 | 246 | 83.90 | 32.02 |
| 27 | Magnasoft Fluid | 15.27 | 15 | 78.20 | 35.60 |
| Control, polymeric material and no Surface Wettability Modifier | None (N/A) | 5.26 | 300 | 57.9 | 38.2 |
| Uncoated alumina ceramic | None (N/A) | 3.28 | 0 | 36.80 | 60.16 |
| Uncoated sand 20/40 Mesh | None (N/A) | 2.67 | 0 | 46.30 | 55.08 |
| 1 | L-7604 | 94.39 | 1175 | 61.90 | 45.83 |
| 2 | Y-17420 | 64.42 | 821 | 63.20 | 45.03 |
| 3 | Silbreak 321 | 78.57 | 1013 | 59.00 | 47.58 |
| Uncoated sand | None | 24.65 | 0 | N/A | N/A |
| Uncoated ceramic | None | 50.99 | 0 | N/A | N/A |

Table 1 shows proppant with surface wettability modifiers have much higher oil flow compared to control sample of uncoated sand. Proppant with surface wettability modifiers have higher water contact angles and lower surface energy compared to control sample of uncoated sand. Proppant with surface wettability modifiers is neutral wet compared to the control sand which is more water wet.

The 40/70 proppant materials that have silicone-containing and fluorine-containing surface wettability modifiers have significant increase in the water contact angle compared to the controls, sand and ceramic, while simultaneously decreasing the surface energy compared to sand and ceramic. Thus, the surface wettability modifiers make the proppant materials less water wettable (based on the water contact angle), and more likely to be wetted by oil (based on the surface energy). The surface wettability modifiers that show the best ability to improve oil flow were believed to be hydrophobic yet oleophilic prior to any lab testing.

The surface wettability modifiers that modify wettability the most tend to modify the surface wettability such that the water contact angle approaches 90°. The proppant material becomes significantly less water wettable than sand and ceramic. This increase in water contact angle compared to control (sand or ceramic) is accompanied by a concomitant increase in the flow of liquid hydrocarbon (represented in our work by Isopar™ L fluid) through a pack of the coated/treated material/proppant, suggesting better hydrocarbon recovery/productivity.

Also, the surface energy relative to sand/ceramic decreases upon application of the surface wettability modifiers. There is a downward trend in surface energy, especially observable for the 40/70 substrate (where there is more surface area), and this trend is toward the range described herein at surface energies of 20-30 mJ/m², surfaces are wetted by hydrocarbon oils and are water repellent. At critical surface energies below 20 mJ/m², hydrocarbon oils no longer spread and the surfaces are both hydrophobic and oleophobic. It is also believed that any phenolic coating (for example Prime Plus) tends to be better than uncoated substrate in terms of increasing water contact angle and decreasing surface energy.

The 20/40 proppant materials have been observed to have the same general trend for water contact angles and surface energies as the 40/70 proppant materials. It is also additionally observed that the surface wettability modifiers increase the water contact angle and lower the surface energy, which should make the 20/40 particles less water wettable, but more likely to be wetted by oil.

For those skilled it the art, it should be recognized for both the 40/70 and 20/40 case that the flow of oil can be further optimized by controlling the amount on surface wettability modifiers making up the outer coating (1 g of SWM per 1000 g of substrate may not be enough or too much, but most likely not enough) and by controlling the amount of surface area covered by the SWM. Full coverage by means of a continuous coating is likely better than a discontinuous coating. The amount of surface wettability modifiers can be varied to take the water contact angle to as close to 90° as possible, while simultaneously decreasing the surface energy to the 20-50 mJ/m² range.

Theoretical Example 1

To create a more water-wet surface from a resin-coated proppant, 1000 g of a 20/40 white sand coated with 36.5 g of a liquid phenol-formaldehyde resole at 400° F. and post-baked for 5 minutes at 350° F. is treated with 10% of an embedded hydrophilic silane such as triethoxysilylpropoxy(hexaethyleneoxy)dodecanoate or triethoxysilylpropoxy(triethyleneoxy)octadecanoate to achieve a water contact angle of ~30°-70°, indicating that the neutral-wet (or intermediate-wet) surface has been altered to a water-wet surface, resulting in a proppant which would be expected to wet better in the blender tub and facilitate recovery of fracture process water when utilized as the propping agent during hydraulic fracturing operations.

Theoretical Example 2

To create a more oil-wet surface from a polymeric material-coated proppant, 1000 g of a 20/40 white sand coated with 36 g of the phenol-formaldehyde novolac polymeric material SD-672D and 9 g of 40% aqueous hexa at 390° F. is treated with 10% of a silane such as tridecafluorooctyltriethoxysilane or heptadecafluorodecyltrimethoxysilane to achieve a water contact angle of ~110°-120°, indicating that the neutral-wet (or intermediate-wet) surface has been altered to a more oil-wet surface, resulting in a proppant which would be expected to enhance hydrocarbon production and reduce scaling when utilized as the propping agent during hydraulic fracturing operations.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention.

What is claimed is:

1. A proppant material, comprising:
   a substrate material;
   a polymeric material layer disposed on the substrate material; and
   a surface wettability modifier layer disposed on the polymeric material, wherein the surface wettability modifier is selected from the group consisting of a siloxane copolymer, an acrylate copolymer, acrylate materials, and combinations thereof, and wherein the polymeric material is a thermosetting material selected from the group consisting of a phenol-formaldehyde resin, a fluorine free and silicon free epoxy resin, a terpolymer of phenol-furfuryl alcohol-formaldehyde, a polymerized furan, a polyurethane resin, a polymerized urea-aldehyde, a polymerized melamine-aldehyde, a polyester, a polyalkyd, a polymerized phenol-aldehyde, and combinations thereof.

2. The proppant material of claim 1, wherein the substrate material is a material selected from the group consisting of inorganic substrates, organic substrates, composite substrates, and combinations thereof.

3. The proppant material of claim 1, wherein the phenol-formaldehyde resin is selected from the group consisting of a fluorine free and silicon free epoxy-modified novolac phenol-formaldehyde resin, a resole phenol-formaldehyde resins, a modified resole phenol-formaldehyde resin, and combinations thereof.

4. The proppant material of claim 1, wherein the polymeric material is disposed in one or more layers, and each layer is a continuous or non-continuous layer.

5. The proppant material of claim 1, wherein the siloxane copolymer and/or the acrylate copolymer is selected from the group consisting of polyalkyleneoxidimethylsiloxane copolymer, siloxane polyalkyleneoxide copolymer, fluoroalkylmethacrylate copolymers, fluoroalkylacrylate copolymers, heptadecafluorodecyltrimethoxysilane polyalkylenedimethylsiloxane copolymer, acryloxy terminated dimethylsiloxane-ethyleneoxide block copolymers, (methacryloxypropy)methylsiloxane-dimethylsiloxane copolymers, (acryloxypropyl)methylsiloxane-dimethylsiloxane copolymers, and combinations thereof.

6. The proppant material of claim 1, wherein the surface wettability modifier is a material selected from the group consisting of polyalkyleneoxidimethylsiloxane copolymer, siloxane polyalkyleneoxide copolymer, 2-hydroxy ethyl methacrylate (HEMA), and combinations thereof.

7. The proppant material of claim 1, wherein the proppant material has a particle size range of about 10 mesh to about 200 mesh.

8. The proppant material of claim 1, wherein the proppant material has a water contact angle from about 59° to about 120° and a surface energy from about 20 mJ/m$^2$ to about 50 mJ/m$^2$.

9. The proppant material of claim 1, wherein the acrylate material is selected from the group consisting of fluoroalkylmethacrylate copolymers, fluoroalkylacrylate copolymers, polyester acrylates, epoxy modified acrylates, urethane acrylates oligomers, and combinations thereof.

10. A method for treating a subterranean formation, comprising:
    injecting a fracturing fluid into the subterranean formation, wherein the fracturing fluid comprises a proppant material selected from the group consisting of:
    a first proppant material comprising a first substrate material, a first polymeric material layer disposed on the substrate material, and a surface wettability modifier layer disposed on the polymeric material;
    a second proppant material comprising a second substrate material and a second polymeric material layer disposed on the substrate material; and
    a third proppant material comprising a composite substrate having a third polymeric material layer and a filler material dispersed throughout the third polymeric material layer, wherein the surface wettability modifier or the first, second, or third polymeric material provides the proppant material with a water contact angle from about 59° to about 120° and a surface energy from about 20 mJ/m$^2$ to about 50 mJ/m$^2$ and the surface wettability modifier is a material selected from the consisting of a siloxane copolymer, an acrylate copolymer, acrylate materials, and combinations thereof, and wherein each of the first, second, or third polymeric material comprise a thermosetting material selected from the group consisting of a phenol-formaldehyde resin, a fluorine free and silicon free epoxy resin, a terpolymer of phenol-furfuryl alcohol-formaldehyde, a polymerized furan, a polyurethane resin, a polymerized urea-aldehyde, a polymerized melamine-aldehyde, a polyester, a polyalkyd, a polymerized phenol-aldehyde, and combinations thereof.

11. The method of claim 10, wherein the siloxane copolymer and/or the acrylate copolymer is selected from the group consisting of polyalkyleneoxidimethylsiloxane copolymer, siloxane polyalkyleneoxide copolymer, fluoroalkylmethacrylate copolymers, fluoroalkylacrylate copolymers, heptadecafluorodecyltrimethoxysilane polyalkylenedimethylsiloxane copolymer, acryloxy terminated dimethylsiloxane-ethyleneoxide block copolymers, (methacryloxypropy)methylsiloxane-dimethylsiloxane copolymers, (acryloxypropyl)methylsiloxane-dimethylsiloxane copolymers, and combinations thereof.

12. The method of claim 10, wherein the substrate material is a material selected from the group consisting of inorganic substrates, organic substrates, composite substrates, and combinations thereof.

13. The method of claim 10, wherein the phenol-formaldehyde resin is selected from the group consisting of a fluorine free and silicon free epoxy-modified novolac phenol-formaldehyde resin, and combinations thereof.

14. The method of claim 10, wherein each of the first, second, or third polymeric material is disposed in one or more layers, and each layer is a continuous or non-continuous layer.

15. The method of claim 10, wherein the surface wettability modifier is a material selected from the group consisting of polyalkyleneoxidimethylsiloxane copolymer, siloxane polyalkyleneoxide copolymer, 2-hydroxy ethyl methacrylate (HEMA), and combinations thereof.

16. The method of claim 10, wherein the acrylate material is selected from the group consisting of fluoroalkylmethacrylate copolymers, fluoroalkylacrylate copolymers, polyester acrylates, epoxy modified acrylates, urethane acrylates oligomers, and combinations thereof.

* * * * *